March 9, 1965  A. E. HIRSCHLER  3,172,731
HUMIDITY INDICATING DEVICES
Filed Feb. 21, 1961

INVENTOR.
ALFRED HIRSCHLER
BY
ATTORNEY

3,172,731
HUMIDITY INDICATING DEVICES
Alfred E. Hirschler, Springfield, Pa., assignor to Sun Oil Company, Philadelphia, Pa., a corporation of New Jersey
Filed Feb. 21, 1961, Ser. No. 90,752
26 Claims. (Cl. 23—230)

This application is a continuation-in-part of copending application Serial No. 811,540, filed May 7, 1959, now abandoned.

This invention relates to a new composition of matter comprising an acidic adsorbent impregnated with small amounts of an organic compound for use in the determination of minor amounts of water contained in substantially nonaqueous fluids.

It is known that certain colorless aromatic alcohols will form colored salts when the alcohol is reacted with a strong liquid acid under proper conditions. On the other hand, certain organic compounds form colored carbonium ions upon contact with strong liquid acids under proper conditions. Those organic compounds capable of forming colored carbonium ions upon reaction with a strong acid include certain aromatic olefins such as diphenyl ethylene and 1,1,3,3-tetraphenylbutene-1, and the like; certain polycyclic aromatic hydrocarbons such as pyrene, chrysene, perylene, and the like; and certain colorless aromatic alcohols, namely, the arylmethanols. The equation which describes the latter reaction is:

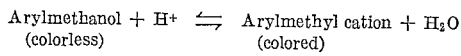

Arylmethanol + H+ ⇌ Arylmethyl cation + H₂O
(colorless)           (colored)

Generally, a strong acid is needed to effect the reaction; for example, strong sulfuric acid as used by Deno et al. in J. Am. Chem. Soc. 77, 3044 (1955).

Deno demonstrated that the extent of formation of the colored carbonium ion was a function of the sulfuric acid concentration, for any given indicator. They defined an acidity function, $C_0$, by means of the equation $$C_0 = pK_R^+ - \log(C_R^+/C_{ROH})$$

where $C_R^+$ and $C_{ROH}$ are the concentrations of arylmethyl cation and arylmethanol respectively. Their work indicated that the acidity function, $C_0$, was generally independent of the structure of the arylmethanol. The most convenient means to specify the acid strength required to convert a given arylmethanol to the corresponding carbonium ion is in terms of the $pK_R^+$ for that indicator. As shown by the above equation, $pK_R^+$ is numerically equal to $C_0$ at that sulfuric acid concentration where $C_R^+ = C_{ROH}$; that is, when the arylmethanol is half converted to carbonium ion.

The present invention is based on the discovery that the colored carbonium ion can be produced by impregnating an acidic adsorbent with a small amount of an organic compound, for example, an arylmethanol. The reaction, described above, is between the arylmethanol and the protonic acids on the surface of the solid acidic adsorbent. The reaction is a reversible equilibrium reaction; therefore, exposure of the impregnated adsorbent to a sufficiently high partial pressure of water (relative humidity) completely discharges the color since the arylmethyl cation is converted to the colorless arylmethanol. Further, for a given adsorbent and organic compound, it has been discovered that this reversible color change takes place over a moderately narrow range of relative humidity, and therefore, the coloration of such a solid can be used as a very inexpensive humidity indicating means.

The present invention is further based on the discovery that as water is progressively added to a solid acid adsorbent, the acid strength is lowered in a smooth progressive manner; but considerable acidity may remain even when many molecules of water have been adsorbed for each acid site present. Some adsorbents, such as commercial silica-alumina cracking catalysts, retain acidity stronger than 1% $H_2SO_4$ even when immersed in liquid water. Adsorption of about 5 molecules of water per acid site upon a commercial silica-alumina catalyst eliminates all acidity strong enough to form a carbonium ion from diphenylcarbinol (77% $H_2SO_4$) but the acidity stronger than 50% $H_2SO_4$ (triphenylcarbinol) is actually 20% higher than for the dry catalyst. With 10 moles of water per acid site adsorbed, the acidity stronger than 50% $H_2SO_4$ has been reduced to about 10% less than for the dry catalyst. About 25 moles of water per acid site are needed before triphenylcarbinol no longer is converted into the colored carbonium ion. Similarly, adsorption of about 50 moles of water per acid site prevents carbonium ion formation from tri-p-tolyl-carbinol (34% $H_2SO_4$). Since the amount of water adsorbed on a high-area porous adsorbent is a function of the partial pressure of water, or relative humidity, above the catalyst, it follows that the acid strength of the solid decreases in a regular manner with increasing relative humidity. Thus, by impregnating separate portions of an acidic solid with a series of indicators of different $pK_R^+$ values, inexpensive humidity indicating devices covering a range of relative humidity can be prepared.

Figure 1:
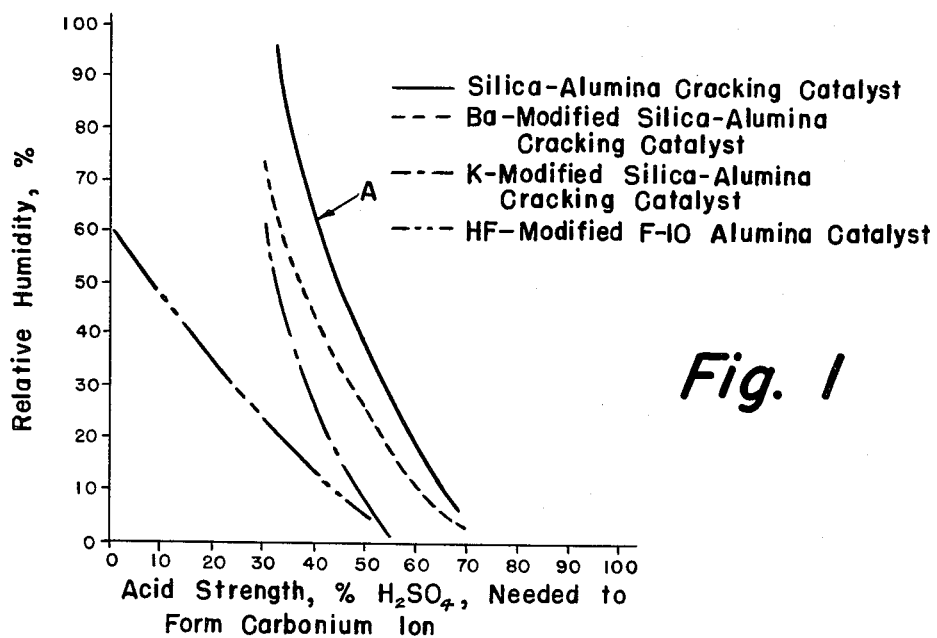
FIGURE 1 is a plot representing the relationship of acid strength needed to convert the organic compound to the carbonium ion and the relative humidity at which the color change takes place for various solid adsorbents.

The preferred organic compounds are the arylmethanols for use in the preparation of the new composition of matter. According to this invention, the arylmethanols can be either monoarylmethanols, diarylmethanols, or triarylmethanols. These arylmethanols can be either non-substituted or substituted. Substituent groups in the arylmethanols can include not only alkyl, alkynyl and alkenyl but also the fluorenyl and bornyl groups. The general formula for such compounds can be

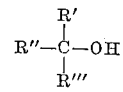

wherein at least one R must be aryl or substituted aryl; the other two R groups can be any combination of the following: hydrogen, aryl, alkyl, alkynyl, alkenyl, fluorenyl, and bornyl radicals; each aryl group being defined as

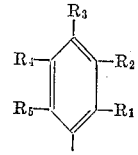

wherein $R_1$, $R_2$, $R_3$, $R_4$ and $R_5$ can be any combination of the following: hydrogen, halogen, alkyl, alkoxy, nitro, amino, and aryl radicals. Preferably, each aryl group should contain no more than 12 carbon atoms total in substituent groups. Examples of such arylmethanols are 2,4,6-trimethyl benzyl alcohol,
4,4'-dimethyoxytriphenylmethanol,
4-methoxytriphenylmethanol,
4,4',4''-trimethyltriphenylmethanol,
2,2',2''-trimethyltriphenylmethanol,
diphenylmethanol,
4,4',4''-tri-t-butyltriphenylmethanol,
4,4',4''-trinitrotriphenylmethanol,
3,3',3''-trichlorotriphenylmethanol,
4,4',4''-trichlorotriphenylmethanol, triphenylmethanol,
4,4',4''-triisopropyltriphenylmethanol,
2-phenylborneol, and
9-methyl-9-fluorenol.

Any other arylmethanol, and any other organic compound, which is capable of forming a colored carbonium ion on catalysts of the type hereinafter decribed, and the preparation of which is known to those skilled in the art, can be used satisfactorily in impregnating the adsorbent.

The adsorbent for use in preparing the new composition of matter can be any solid adsorbent which has fairly strong acidic characteristics. Siliceous adsorbents, such as synthetic cracking catalyst and adsorptive clays are particularly suitable. Specific examples are silica-alumina and kaolin cracking catalyst, natural Attapulgus clay which has been activated by acid treatment, and synthetic calcium, and magnesium silicates, such as "molecular sieves." Other acid solids that can be used satisfactorily are hydrated oxides, such as alumina treated with inorganic acids like sulfuric or hydrofluoric acids or with an acid oxide such as boric oxide or with aluminum halides such as aluminum chloride or aluminum bromide. The so-called platinum reforming catalysts, e.g., chlorided alumina containing small amounts of platinum, are particularly useful in the extremely low ranges of relative humidity measurement.

Thus, the new composition discovered consists essentially of an acidic adsorbent impregnated with a small amount of an organic compound as described hereinbefore.

The acid strength needed to form the colored carbonium ion and, therefore, the relative humidity at which the reversible color change takes place can be varied within wide limits in a predetermined manner by placing various substituent groups on one or more of the aryl groups in the arylmethanol. With a given arylmethanol, the relative humidity at which a color change takes place depends also on the properties of the adsorbent used for a support, the acid strength distribution, and the degree to which its acid strength distribution is affected by water.

Partial neutralization of the acidity of an adsorbent of the types described, with ions of metals in Groups IA and IIA of the Periodic Table, ammonia, or a basic organic compound such as one of the amines, increases the water affinity of the adsorbent and thereby lowers the relative humidity at which the color change takes place with a given arylmethanol. Thus, with a given adsorbent and arylmethanol, humidity indicating solids changing color at various predetermined levels of relative humidity can be produced by controlling the amount of metal ion or base component added to the solid. By varying the type of adsorbent, the acid strength response of the arylmethanol, and the amount of added metal ion or base, a humidity indicating solid can be prepared that will change color at any desired relative humidity from very high to very low values.

The present invention is also based on the discovery of a method of determining the amount of water present in a substantially nonaqueous fluid by contacting said fluid with a plurality of such treated adsorbents, determining the presence of the colored carbonium ion using a color sensitive device, and relating the presence of the said carbonium ion to the amount of water present in the substantially nonaqueous surrounding medium. The term "nonaqueous fluid medium" as used herein means a fluid in either the gas or liquid phase whose components, other than water contained therein, are essentially nonreactive to the arylmethanol-solid adsorbent system. For example, a pure olefinic hydrocarbon would probably react with the impregnated adsorbent in such a manner as to nullify the ability of the impregnated adsorbent to respond to the water content of the surrounding fluid medium. Also, any volatile, fairly basic compound such as ammonia, present in significant quantities in the surrounding fluid, can interfere with the operability of the detecting system.

The fluid medium being tested can be relatively stationary or it may be flowing by the impregnated adsorbent or it may flow through a bed of the adsorbent. Any mechanism of contact whereby the fluid medium can be said to "surround" and be in intimate contact with the impregnated adsorbent is satisfactory to effect the response of the adsorbent to the water content of the fluid.

The method of determining the amount of water present in a nonaqueous fluid medium using the new composition of matter as a humidity indicating device can be used at ambient temperatures, for example, to indicate weather changes such as the approach of rain, or can be used to measure the degree of exhaustion of adsorbent beds used in the drying of gases, or can be used to indicate the amount of water dissolved in hydrocarbons by passing the hydrocarbon in liquid or vapor phase over the appropriate treated adsorbent. Some of the present compositions can also be used at elevated temperatures up to about 300° C. for indicating the water content of various fluids such as gases and liquid hydrocarbons. A particularly useful embodiment of this invention utilizes a bed or column of suitably impregnated adsorbent which is in colored form. Then, by passing a fluid medium through the bed, a band or ring of decolorized adsorbent will form at the beginning of the bed and will slowly move through the bed at a rate which is a function of the water content of the fluid medium. Thus, a simple device is provided that is useful in determining the water content of a fluid with a known flow rate, by measuring the rate at which the decolorized band moves through a bed of impregnated adsorbent.

In another useful application of this invention the moisture content of a so-called "dry box" can be controlled and/or determined. Generally, it is extremely difficult to measure the small quantities of moisture which can be present in a "dry box" without using expensive and complicated devices. According to this invention a solid adsorbent can be impregnated with a preselected arylmethanol that will form a colored carbonium ion which is responsive to extremely small amounts of moisture. Thus, a relatively simple and economical device is available for such "dry box" applications.

A still further useful application of this invention embodies the use of a plurality of devices each covering a given relative humidity level thereby providing a unified apparatus for covering a wide range of relative humidity.

The color change of the treated solid, indicating the relative humidity or water content, can be perceived visually or with a simple photoelectric device. The responsive point of the impregnated adsorbent to a preselected water content can be determined, with the device, when the color is forming on the adsorbent or when the color, previously formed, is disappearing from the adsorbent. Any color sensitive device can be used satisfactorily. The colored arylmethyl cation formed as hereinabove described can have an absorption spectrum in the optically visible range and in the ultraviolet range.

The step of impregnation of the solid with the arylmethanol can be performed by any suitable means, such as admixing the solid to be treated with a solution of 0.001% to 0.1% by weight of arylmethanol in benzene or other solvent, then evaporating the solvent, or spraying the solid with the solvent-arylmethanol solution, then heating the solid to evaporate the solvent. It is only necessary that the surface of the solid be wet with the arylmethanol; therefore large particles require less arylmethanol than fine powders. The amount of arylmethanol adsorbed on the surface of the solid, generally will be in the range of 0.001% to 5% by weight. The arylmethyl cation formed has to be present in sufficient quantity to allow perception by visual means or by color sensing devices. The use of a solvent is not critical but is preferred in order to give a reasonable volume of fluid to handle and to provide better distribution of the arylmethanol on the surface of the solid support.

In order that those skilled in the art may more fully understand the invention, the following examples are provided:

Example 1

A commercially available silica-alumina cracking catalyst (approximate composition: 89% silica, 11% alumina) was impregnated with tri-p-tolylmethanol having an acid strength requirement of 34% sulfuric acid. The colored impregnated adsorbent turned almost colorless when exposed to the atmosphere above saturated $$NH_4H_2PO_4$$

at 25° C. which is equivalent to 93% relative humidity. On the other hand, the adsorbent exhibited a sharp color when exposed to the atmosphere above saturated $$SrCl_2 \cdot 6H_2O$$

which is equivalent to 71% relative humidity. The perceptible color change occurred at about 90% relative humidity.

Example 2

The catalyst of Example 1 was impregnated with triphenylmethanol having an acid strength requirement of 50% $H_2SO_4$. The colored impregnated adsorbent turned almost colorless when exposed to the atmosphere above saturated $Ca(NO_3)_2 \cdot 4H_2O$ which is equivalent to 51% relative humidity. On the other hand, the adsorbent exhibited a sharp color when exposed to the atmosphere above $CaCl_2 \cdot 6H_2O$ which is equivalent to 31% relative humidity. The perceptible color change occurred at about 40% relative humidity.

Example 3

The catalyst of Example 1 was impregnated with 3,3′,3″-trichlorotriphenylmethanol having an acid strength requirement of 68% $H_2SO_4$. It was colorless at 11% relative humidity (atmosphere of saturated $LiCl \cdot H_2O$) but exhibited a sharp color at 3.2% (atmosphere of 77% $H_2SO_4$-water solution). The perceptible color change occurred at about 8% relative humidity. Similarly, using diphenylmethanol (acid strength requirement 77% $H_2SO_4$), a perceptible color change occurred at about 50% relative humidity.

The data from the above examples are plotted in FIGURE 1. It is noted that the curve is continuous, indicating a functional relationship between acid strength requirement for producing the carbonium ion and the relative humidity at which a color is perceptible. In other words, by establishing, say, Curve A for a silica-alumina cracking catalyst any organic compound which will form carbonium ions by reaction with acid strength equivalents of between 34% and 68% $H_2SO_4$ can be used to impregnate the catalyst, thereby forming a means for measuring relative humidities between 5% and 90+%. For example, from Curve A it may be determined that to prepare an indicator to measure a relative humidity of 25% one would impregnate the silica-alumina catalyst with an organic compound which is converted to the carbonium ion by sulfuric acid of about 56–60% ($pK_R^+$ between −7.9 and −8.9). Similarly, to indicate a relative humidity of 60%, one would impregnate the catalyst with a compound converted to the carbonium ion by about 39–43% $H_2SO_4$ (corresponding to a $pK_R^+$ between −4.7 and −5.4). Any arylmethanol with a $pK_R^+$ in the designated range could be employed, provided it is sufficiently stable in the presence of the catalyst.

Thus, by using the above technique for each acidic adsorbent, relative humidity indicating devices can be constructed from any organic compound which is capable of forming carbonium ions by reaction with strong acids.

Figure 2:
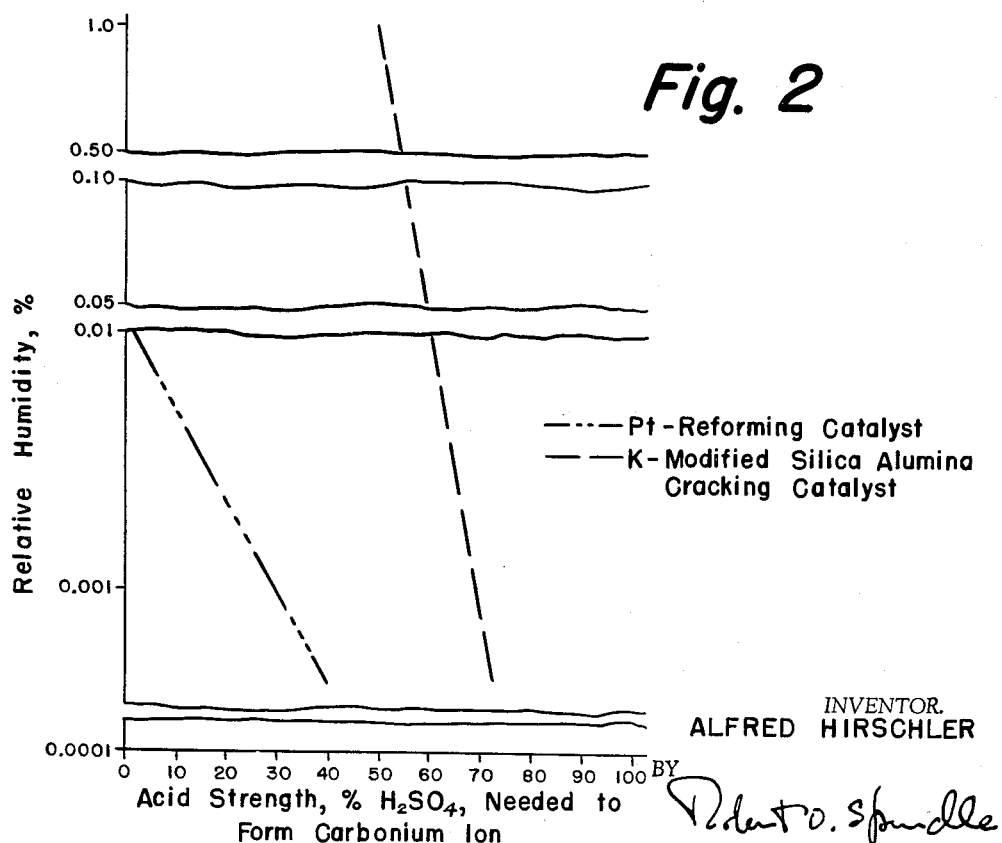
FIGURE 2 is a similar plot as FIGURE 1 but illustrates a much lower range of relative humidity.

The remaining curves in FIGURES 1 and 2 were constructed by using the technique illustrated in Examples 1, 2, and 3. The following examples illustrate the procedure.

Example 4

The silica-alumina cracking catalyst from Example 1 was modified by immersing the catalyst in a solution of 1.0 N barium acetate and then washing with water. This Ba-modified catalyst was impregnated with the following compounds:

| Compound | Acid Strength Req'd., percent | Relative Humidity Exposure | | | | |
|---|---|---|---|---|---|---|
| | | Percent | Color | Percent | Color | Percent Pt. of Chg. |
| Tri-p-tolyl-methanol. | 34 | 51 | Yes | 71 | No | 60 |
| Triphenyl-methanol. | 50 | 11 | Yes | 31 | Trace | 28 |
| 3,3′,3″-Tri-chlorotri-phenyl-methanol. | 68 | 3.2 | Faint | 11 | No | 3 |
| Diphenyl-methanol. | 77 | 3.2 | Trace | 11 | No | 1 |

It is noted, by comparison with Curve A in FIGURE 1, that using triphenylmethanol on Ba-modified silica-alumina catalyst rather than on silica-alumina catalyst decreases the point of response to relative humidity from about 40% to about 28%.

Example 5

The silica-alumina cracking catalyst from Example 1 was modified by immersing the catalyst in a solution of 1.0 N potassium acetate and then washing with water. This K-modified catalyst was impregnated with the following compounds:

| Compound | Acid Strength Req'd., percent | Relative Humidity Exposure | | | | |
|---|---|---|---|---|---|---|
| | | Percent | Color | Percent | Color | Percent Pt. of Chg. |
| Tri-p-tolylmethanol. | 34 | 31 | Yes | 51 | No | 40 |
| Triphenyl-methanol. | 50 | 3.2 | Yes | 11 | No | 7 |
| 3,3′,3″-Trichloro-triphenyl-methanol. | 68 | 0.001 | Yes | 0.002 | Trace | 0.001 |

The above data indicate how the composition of the present invention can be used to build devices which respond to relative humidity ranges from 0.001% to 40%. The former level is ideally suitable for "dry box" use (see FIGURE 2).

Example 6

A commercially available gamma alumina containing chloride was modified by immersing in an alcoholic solution of 48% hydrofluoric acid. This HF-modified adsorbent was impregnated with the following compounds:

| Compound | Acid Strength Req'd., percent | Relative Humidity Exposure | | | | |
|---|---|---|---|---|---|---|
| | | Percent | Color | Percent | Color | Percent Pt. of Chg. |
| Tri-p-methoxy-triphenyl-methanol. | 1.2 | 51 | Yes | 71 | No | 60 |
| Tri-p-tolylmethanol. | 34 | 11 | Yes | 31 | No | 20 |
| Triphenyl-methanol. | 50 | 3.2 | Yes | 11 | No | 7 |
| 4,4′,4″-Trichlorotri-phenylmethanol. | 55 | 0.02 | Yes | 3.2 | No | 0.2 |
| 3,3′,3″-Trichlorotri-phenylmethanol. | 68 | .0001 | Yes | 0.002 | Trace | 0.001 |

The above data shows the use of an acidic alumina as the solid adsorbent. In FIGURE 1, it is noted that, say, triphenylmethanol on silica-alumina responds to a change in color at about 40% relative humidity. But the same compound on acidic alumina (no silica present) responds to a change in color at about 7% relative humidity.

*Example 7*

A commercially available kaolin cracking catalyst was impregnated with the following compounds:

| Compound | Acid Strength Req'd., Percent | Relative Humidity Exposure | | | | |
|---|---|---|---|---|---|---|
| | | Percent | Color | Percent | Color | Percent Pt. of Chg. |
| Tri-p-tolyl-methanol. | 34 | 51 | Yes | 71 | No | 55 |
| Triphenyl-methanol. | 50 | 3.2 | Yes | 11 | No | 10 |
| 4,4',4''-Trichlorotri-phenylmethanol. | 55 | 11 | Yes | 3.2 | No | 6 |
| 3,3',3''-Tri-chorotri-phenylmethanol. | 68 | .002 | Yes | 0.017 | No | 0.008 |

As an illustration of a specific procedure falling within the scope of the present invention, previously manufactured and commercially available silica-alumina cracking catalyst was impregnated by admixing with a solution of 4,4',4" - tritertiarybutyltriphenylmethanol and benzene. The benzene was removed by drying. The yellow color of the 4,4',4" - tritertiarybutyltriphenylmethyl cation formed on the catalyst was stable at ambient temperature in air having a relative humidity below about 50%. When the relative humidity of the air increased above about 50%, the color disappeared.

*Example 8*

A commercially available kaolin cracking catalyst was impregnated with 4,4',4"-tritertiarybutyltriphenylmethanol. The yellow color of the formed cation remained stable in contact with air at ambient temperature only when the relative humidity was below about 10%.

The examples presented above are illustrative of specific embodiments of the present invention and it will be apparent that numerous modifications are possible within the broad scope of the invention. Thus, the invention embodies a new composition of matter suitable for use as a humidity indicator which comprises an acidic adsorbent impregnated with a small amount of an organic compound which is capable of forming a colored carbonium upon reaction with a strong acid.

I claim:

1. A new composition of matter suitable for use as a humidity indicator which comprises a solid acidic adsorbent impregnated with a small amount of an arylmethanol compound; said compound being capable of forming a colored carbonium ion; said composition being capable of undergoing a reversible characteristic color change over a narrow range of relative humidity.

2. A new composition according to claim 1 wherein the adsorbent is an acidic alumina.

3. A new composition according to claim 1 wherein the adsorbent is a siliceous adsorbent.

4. A new composition according to claim 3 wherein the adsorbent is a cracking catalyst.

5. A new composition according to claim 3 wherein the adsorbent is an activated clay.

6. A new composition according to claim 3 wherein the compound is an arylmethanol having 3 aryl groups per molecule.

7. A new composition according to claim 2 wherein the compound is an arylmethanol having 3 aryl groups per molecule.

8. A new composition according to claim 1 wherein the compound is an arylmethanol having 3 aryl groups per molecule.

9. A new composition of matter suitable for use as a humidity indicator which comprises a solid acidic adsorbent impregnated with an arylmethanol having 1 to 3 aryl groups per molecule; said aryl groups containing no more than 12 carbon atoms total in substituent groups; according to the general formula:

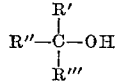

wherein at least one R is aryl and the remaining two R groups are independently selected from the class consisting of hydrogen, aryl, alkyl, alkynyl, alkenyl, fluorenyl, and bornyl; each aryl group being defined as:

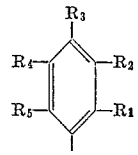

wherein $R_1$, $R_2$, $R_3$, $R_4$ and $R_5$ are independently selected from the group consisting of hydrogen, halogen, alkyl, alkoxy, nitro, amino, and aryl; said composition being capable of undergoing a reversible characteristic color change over a narrow range of relative humidity.

10. A new composition according to claim 9 wherein said arylmethanol has 3 aryl groups per molecule.

11. A new composition according to claim 9 wherein said adsorbent is a siliceous adsorbent.

12. A new composition according to claim 11 wherein the adsorbent is a cracking catalyst.

13. A new composition according to claim 11 wherein the adsorbent is an activated clay.

14. A new composition according to claim 9 wherein the adsorbent is an acidic alumina.

15. A new composition according to claim 9 wherein the adsorbent is impregnated with 0.001% to 5% of said arylmethanol.

16. A new composition of matter suitable for use as a humidity indicator which comprises a solid acidic adsorbent impregnated with an arylmethanol selected from the group consisting of:

4,4'-dimethoxytriphenylmethanol
4-methoxytriphenylmethanol
2,2',2"-trimethyltriphenylmethanol
4,4',4"-trimethyltriphenylmethanol
4-methyltriphenylmethanol
3,3',3"-trimethyltriphenylmethanol
4,4',4"-triisopyropyltriphenylmethanol
triphenylmethanol
4,4',4"-trichlorotriphenylmethanol
4-nitrotriphenylmethanol
3,3',3"-trichlorotriphenylmethananol
4,4',4"-trinitrotriphenylmethanol
4,4',4"-tri-t-butyltriphenylmethanol
dimesitylmethanol
4,4'-dimethoxydiphenylmethanol
9-methyl-9-fluorenol
2,4,6-trimethylbenzyl alcohol
4,4'-dimethyldiphenylmethanol
2,2'-dimethyldiphenylmethanol
4,4'-di-t-butyldiphenylmethanol
diphenylmethanol
4,4'-dichlorodiphenylmethanol
9-fluorenol, and
2-phenylborneol;

said composition being capable of undergoing a reversible characteristic color change over a narrow range of relative humidity.

17. Method of indicating the amount of water present in a substantially nonaqueous fluid medium which comprises contacting such medium with a composition comprising a solid acidic adsorbent impregnated with a small amount of an arylmethanol compound; said compound being capable of formng a colored carbonium ion; whereby a reversible characteristic color change of the absorbent indicates the water content of said medium.

18. Method according to claim 17 wherein said compound in an arylmethanol having 3 aryl groups per molecule.

19. Method according to claim 18 wherein said adsorbent is an acidic alumina.

20. Method according to claim 18 wherein said adsorbent is a siliceous adsorbent.

21. Method of indicating the amount of water present in a substantially nonaqueous fluid medium whch comprises contacting such medium with a composition comprising a solid acidic adsorbent impregnated with an aryl methanol having 1 to 3 aryl groups per molecule; said aryl groups containing no more than 12 carbon atoms total in substituent groups; according to the general formula:

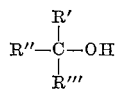

wherein at least one R is aryl and the remaining two R groups are independently selected from the class consisting of hydrogen, aryl, alkyl, alkynyl, alkenyl, fluorenyl, and bornyl; each aryl group being defined as:

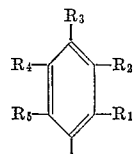

wherein $R_1$, $R_2$, $R_3$, $R_4$ and $R_5$ are independently selected from the class consisting of hydrogen, halogen, alkyl, alkoxy, nitro, amino and aryl; whereby a reversible characteristic color change of the adsorbent indicates the water content of said medium.

22. Method according to claim 21 wherein said arylmethanol has 3 aryl groups per molecule.

23. Method according to claim 21 wherein said adsorbent is a siliceous adsorbent.

24. Method according to claim 21 wherein said adsorbent is an acidic alumina.

25. Method of indicating the amount of water present in a substantially nonaqueous fluid medium which comprises contacting such medium with a composition comprising a solid acidic adsorbent impregnated with an arylmethanol selected from the group consisting of:

4,4'-dimethoxytriphenylmethanol
4-methoxytriphenylmethanol
2,2',2''-trimethyltriphenylmethanol
4,4'4''-trimethyltriphenylmethanol
4-methyltriphenylmethanol
3,3',3''-trimethyltriphenylmethanol
4,4'-4''-triisopropyltriphenylmethanol
triphenylmethanol
4,4'-4''-trichlorotriphenylmethanol
4-nitrotriphenylmethanol
3,3',3''-trichlorotriphenylmethanol
4,4'-4''-trinitrotriphenylmethanol
4,4'-4''-tri-t-butyltriphenylmethanol
dimestylmethanol
4,4'-dimethoxydiphenylmethanol
9-methyl-9-fluorenol
2,4,6-trimethylbenzyl alcohol
4,4'-dimethyldiphenylmethanol
2,2'-dimethyldiphenylmethanol
4,4'-di-t-butyldiphenylmethanol
diphenylmethanol
4,4'-dichlorodiphenylmethanol
9-fluorenol, and
2-phenylborneol;

whereby a reversible characteristic color change of the adsorbent indicates the water content of said medium.

26. Method according to claim 25 wherein the adsorbent is impregnated with 0.001% to 5% of said arylmethanol.

References Cited in the file of this patent

Weitz et al.: Polarization and Color Change in the Adsorption on Surface-Active Substances, in Chemical Abstracts, vol. 34; pages 95 and 3258, 1940.

Nesh, F.: Determination of Minute Traces of Water by Use of Methylene Blue, in Analytical Chemistry, 27 (11); pp. 1842-3, November 1955.

Deno et al.: J. Am. Chem. Soc., vol 77, pages 3044-51; ibid, vol. 78, pages 582-4.